United States Patent [19]

Sigl et al.

[11] Patent Number: 5,543,370
[45] Date of Patent: Aug. 6, 1996

[54] COMPOSITE MATERIALS BASED ON BORON CARBIDE, TITANIUM DIBORIDE AND ELEMENTAL CARBON AND PROCESSES FOR THE PREPARATION OF SAME

[75] Inventors: Lorenz Sigl, Lechaschau, Austria; Hubert Thaler, Kempten; Karl-Alexander Schwetz, Sulzberg, both of Germany

[73] Assignee: Elektroschmelzwerk Kempten GmbH, München, Germany

[21] Appl. No.: 248,388

[22] Filed: May 24, 1994

[30] Foreign Application Priority Data

Jun. 11, 1993 [DE] Germany .................. 43 19 460.5

[51] Int. Cl.⁶ ............................................ C04B 35/52
[52] U.S. Cl. ....................... 501/92; 501/87; 501/96; 501/99; 428/698
[58] Field of Search ........................ 501/87, 89, 91, 501/92, 93, 96, 98, 99; 428/704, 698

[56] References Cited

U.S. PATENT DOCUMENTS

| Re. 23,789 | 2/1954 | Montgomery et al. | 106/43 |
| 4,379,852 | 4/1983 | Watanabe et al. | 501/87 |

FOREIGN PATENT DOCUMENTS 8808328  11/1988  WIPO.

*Primary Examiner*—A. A. Turner
*Attorney, Agent, or Firm*—Collard & Roe, P.C.

[57] ABSTRACT

A composite material includes boron carbide and titanium diboride in a volume ratio $B_4C/TiB_2$ of from 90:10 to 10:90 parts and a proportion of elemental carbon greater than 2% by weight up to a maximum of 50% by weight, based on the boron carbide content. The composite material has a density greater than 92% TD, a hardness HK 0.1 greater than 2300, a four-point flexural strength greater than 400 MPa and a fracture toughness greater than 3.5 MPa√m. The composite material is suitable for producing wear-resistant components or cutting tools.

12 Claims, No Drawings

COMPOSITE MATERIALS BASED ON BORON CARBIDE, TITANIUM DIBORIDE AND ELEMENTAL CARBON AND PROCESSES FOR THE PREPARATION OF SAME

BACKGROUND OF THE INVENTION

1. Field of the Invention

The present invention relates to composite materials based on boron carbide, titanium diboride and elemental carbon and processes for the production thereof.

2. The Prior Art

Boron carbide is a material which has high hardness and a high resistance to abrasive wear, and is therefore widely used in applications where high abrasion resistance is required, for example for sand blasting nozzles. However, boron carbide has the disadvantage of high brittleness. It is known that pure boron carbide can be pressurelessly sintered to densities of greater than 95% of the theoretical density (TD) of the material only through addition of carbon-containing sintering aids. Free carbon is therefore an unavoidable constituent of the microstructure in all pressurelessly sintered, monolithic boron carbide ceramics. This constituent of the microstructure has a similar effect to finely distributed porosity and therefore negatively influences the mechanical properties of the sintered body, in particular the hardness. It is therefore undesired.

Boron carbide materials containing less than 8% by weight of elemental carbon are hereinafter designated as self-bonded boron carbide. At a free carbon content of, for example, 3% by weight, this material has a fracture toughness of about 2.3 MPa√m (measured by the bridge method). Self-bonded boron carbide has therefore not hitherto been able to become established in applications in which the resistance to impact wear plays a part. The situation of limited wear resistance to impact wear is first and foremost due to the insufficient toughness of self-bonded boron carbide. Attempts have therefore been made to reinforce this material, like other brittle monolithic ceramics too, by blending with other materials, for example, by dispersion of particulate hard materials. This particle reinforcement is a known method of increasing the toughness of brittle ceramic materials.

Thus, EP 94,591 (corresponding to U.S. Pat. No. 4,524,138) discloses the toughening of boron carbide by the addition of particles of suitable hard material phases. This disclosure describes polycrystalline sintered bodies of boron carbide with additions of α-SiC and free carbon, which significantly exceed both the toughness and also the strength of pure boron carbide. In a similar way to silicon carbide, other hard materials in equilibrium with boron carbide can also be used to improve the mechanical properties of boron carbide.

Materials which have proven particularly suitable for the purpose of particle reinforcement of boron carbide are borides, specifically the borides of transition elements of the groups IVa to VIa of the Periodic Table. Shaped bodies having improved wear resistance as a result of the combination of boron carbide with a not-readily-fusible metal boride are described in DE 2,451,774 (corresponding to GB 1,479,589). While the particle composite materials mentioned in DE 2,451,774 are formed by mixing of the desired hard material phases and subsequent sintering, processes have also been described in which the desired phase composition of the material is only formed after a suitable reaction of the starting materials prior to sintering.

Such a process for producing a particle-reinforced composite material of boron carbide and boron-rich transition metal borides, in particular diborides, is disclosed in U.S. Pat. No. 2,613,154. This patent describes shaped bodies comprising boron carbide and more than 50% by volume of a boride selected from the group consisting of $TiB_2$, $VB_2$, $CrB_2$, $ZrB_2$, $NbB_2$, $Mo_2B_5$, $W_2B_5$, $HfB_2$ and $TaB_2$. In accordance with the reaction $$(1+x)B_4C+2Me \rightarrow xB_4C+2MeB_2+C \qquad (1)$$

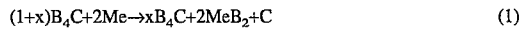

a suitable metal and boron carbide form a metal boride, a proportion of unreacted boron carbide which appears suitable and free carbon. Even in boride-particle-reinforced boron carbide ceramics, free carbon is viewed as an undesired constituent of the microstructure. U.S. Pat. No. 2,613,154 thus proposes that the proportion by weight of free carbon has to be less than 2% based on the proportion by weight of boron carbide (see claim 1, column 11, lines 46–48). To keep the amount of free carbon during reaction (1) as small as possible, the use of boron-rich boron carbide is recommended. For example, in lines 40–43, column 3, the use of boron carbide having a boron content of 83% by weight is described. This measure is possible because boron carbide possesses a wide homogeneity range which varies between the compositions $B_{4.33}C$ and $B_{10.5}C$.

Another process for producing a particle reinforced composite material of boron carbide and suitable borides, in particular diborides, is disclosed in EP 343,873. There, the boron carbide has added to it a suitable titanium-containing substance such as, for example, titanium oxide, titanium nitride, titanium carbide or metallic titanium and, if desired, a carbon- or hydrogen-containing reducing agent which reacts with boron carbide to form titanium diboride and carbon monoxide, for example, in accordance with $$(1+x)B_4C+2TiO_2+3C \rightarrow xB_4C+2TiB_2+4CO \qquad (2)$$

with the formation of the desired boride. After the reaction, sintering forms a dense shaped body of boron carbide and titanium diboride.

A further process for producing boride-containing boron carbide materials, in which the addition of tungsten carbide or titanium carbide results in the formation of the borides $W_2B_5$ or $TiB_2$ by reaction sintering in accordance with the reaction equations $$B_4C+2TiC \rightarrow 3C+2TiB_2 \qquad (3)$$

$$5B_4C+8WC \rightarrow 8C+4W_2B_5 \qquad (4)$$

is described in U.S. Pat. No. 4,670,408. In this disclosure as well (see column 2, lines 35 to 39), it is recommended that the free carbon which is formed in accordance with the reaction equations (3) and (4) be bound by the addition of elemental boron in the form of boron carbide by the reaction $$C+4B \rightarrow B_4C \qquad (5)$$

to avoid its deleterious effect.

H. Hofmann and G. Petzow have also established (*Journal of the Less-Common Metals,* Volume 117, pp. 121–127, 1986) that optimal strength is only achieved if boron carbide ceramics reinforced with $W_2B_5$ and $TiB_2$ no longer contain any free carbon.

These documents and also numerous other publications (see, for example, R Telle and G Petzow, "Proceedings of the 9th Int. Symposium on Boron, Borides and Related Compounds," Duisburg 1987, pp. 234–244, and R. Telle, G., Petzow, J. Adlerborn and K. Weiss, ibid., pp. 453–54) agree that boride particles significantly improve the sinterability of pure boron carbide and also its strength and toughness, but that free carbon in the sintered bodies is preferably to be avoided. Thus, free carbon in boride-reinforced boron carbide materials has hitherto been believed to be undesirable and deleterious to the properties of these materials, and for this reason free carbon has been avoided if possible in the specified composite materials.

SUMMARY OF THE INVENTION

It is an object of the present invention to provide tough, strong and hard composite materials based on boron carbide, titanium diboride and free carbon and also processes for the production thereof.

This object is achieved by composite materials comprising boron carbide and titanium diboride in a volume ratio $B_4C/TiB_2$ of from 90:10 to 10:90 parts and a proportion of elemental carbon of greater than 2% by weight up to a maximum of 50% by weight based on the boron carbide content.

The materials of the invention preferably comprise boron carbide and titanium diboride in a volume ratio $B_4C/TiB_2$ of from 90:10 to 40:60 parts and a proportion of elemental carbon of greater than 2% by weight up to a maximum of 20% by weight based on the boron carbide content.

Particularly preferably, the materials of the invention comprise boron carbide and titanium diboride in a volume ratio $B_4C/TiB_2$ of from 90:10 to 60:40 parts and a proportion of elemental carbon of greater than 2% by weight up to a maximum of 10% by weight based on the boron carbide content.

Surprisingly, it has been found in the present invention that the mechanical properties of boron carbide/titanium diboride materials which comprise boron carbide and titanium diboride in any volume ratio from 90:10 to 10:90 parts can be considerably improved by addition of free carbon in amounts of greater than 2% by weight up to a maximum of 50% by weight.

In particular, the fracture toughness $K_{IC}$ and the strength of the carbon-containing boron carbide/$TiB_2$ materials of the invention is significantly increased in comparison with known materials.

The materials of the invention possess a density of at least 92% TD, a hardness HK0.1 of greater than 2,300, a flexural fracture strength of at least 400 MPa (measured on a flexural test specimen of dimensions 4×3×45 mm³ by the four-point method at room temperature, distance between inner support points 20 mm, distance between outer support points 40 mm) and a fracture toughness (measured by the bridge method on flexural test specimens of the above-mentioned geometry) of at least 3.5 MPa√m.

If desired, the sintered bodies of the invention can contain small amounts totalling less than 1% by weight of metallic or non-metallic impurities which are present as a result of the fabrication or as a residue in the powder mixtures used as starting material.

The boron carbide/$TiB_2$/C composite materials of the invention are produced by pressureless solid-phase sintering and, if desired, subsequent further densification by hot isostatic pressing.

The production process of the invention comprises (1) homogeneously mixing finely divided powders of boron carbide and titanium diboride in a volume ratio $B_4C/TiB_2$ of from 90:10 to 10:90 parts with a carbon-containing additive in the form of finely divided carbon and/or an organic material which can be carbonized at temperatures up to 1200° C. with formation of carbon, and/or titanium carbide, (2) shaping this mixture into green bodies of a density of at least 50% TD, (3) if desired, depending on the carbon-containing additive used, heating the green body thus formed to produce the free carbon, and (4) pressurelessly sintering the green body thus treated with exclusion of oxygen at temperatures of from 2100° C. to 2250° C. to give bodies having a density of at least 92% TD.

The free carbon is preferably used in an amount of greater than 2% by weight up to 50% by weight of free carbon, based on the boron carbide content of the starting powder mixture. It is introduced into the composite material by the following embodiment of the process of the invention:

(a) If the carbon carrier is introduced into the starting powder mixture as amorphous carbon, for example, in the form of carbon black, step (3) of the above-described process of the invention is omitted, since the free carbon has already been introduced into the green body via the powder mixture.

(b) If the carbon carrier is introduced into the starting powder mixture as carbon in an organically bound form, the conversion of these organic carbon carriers into free carbon in step (3) of the process of the invention is carried out by pyrolysis with exclusion of air. Examples of such organic carbon carriers are, for example, waxes, resins, pressing aids or sugar.

(c) If the carbon carrier is introduced into the starting powder mixture as titanium carbide in powder form, the formation of the free carbon in step (3) of the above-described process of the invention proceeds by a reaction of the titanium carbide with boron carbide in accordance with $$B_4C+2TiC \rightarrow 3C+2TiB_2 \qquad (6)$$

The starting material used to carry out the process of the invention is advantageously a boron carbide powder having a purity of at least 98.5% by weight, which for the purposes of the present invention means that the sum of boron and carbon analyses is at least 98.5% by weight, with a B:C atomic ratio in the range from 3.5 to 4.5:1. Metallic impurities totalling up to 0.5% by weight can be tolerated. The remaining contribution to make up 100% by weight is divided between oxygen and nitrogen in the form of adhering boron oxide and boron nitride, with the sum of oxygen and nitrogen analyses being less than 1% by weight. As a measure of the required particle fineness, use is advantageously made of the specific surface area (measured by the BET method) and the particle size measured by the Fisher Sub-Sieve Sizer Method.

The boron carbide powder used can be amorphous or crystalline. It can be obtained directly by deposition from the gas phase, for example, from boron halides or boranes and gaseous hydrocarbons. However, for economic reasons it is advantageous to start with coarse-grained crystalline boron carbide which has been produced on an industrial scale, for example, by the process of melt reduction of boric acid by carbon in an electric furnace. This is first subjected to intensive milling to particle sizes of about 3 μm and finer, and the powder having the desired specific surface area is subsequently separated therefrom by conventional known processes such as air classification or elutriation.

The boron carbide starting material used to carry out the process of the invention is advantageously a powder having a specific surface area measured by BET of from 5 to 50 $m^2/g$, in particular from 10 to 20 $m^2/g$. Such powders are commercially available or can be produced from commercially available powders by milling in a known manner.

The titanium diboride used as starting material advantageously has an average FSSS particle size of less than 6 82 m, preferably less than 3 μm, and a specific surface area measured by BET of greater than 0.5 $m^2/g$, in particular greater than 1 $m^2/g$. Commercial $TiB_2$ powders of sufficient fineness are particularly suitable for economic reasons.

The carbon-containing additive can be used in any form which ensures uniform distribution in the finely divided mixture, for example, as particulate carbon black, or colloidal graphite, having a BET surface area in the range from 10 to 400 $m^2/g$. To achieve good pressing properties of the powder mixtures containing carbon black or colloidal graphite, small amounts of a temporary binder and/or lubricant are advantageously also used. Examples of such temporary binders are polyvinyl alcohol and polystyrene; and examples of the lubricants include stearic acid, metal stearates and polyethylene glycol. These so-called pressing aids are preferably used in total amounts of up to a maximum of 2% by weight based on the resulting mixture. The carbon-containing additive can likewise be used in the form of an organic material which can be carbonized at temperatures of up to 1000° C. to form carbon. Examples of these are phenolic resins and bituminous coal pitch, with phenol/formaldehyde condensation products of the novolak and resol types having proven particularly suitable, which are decomposed in the range of 100°–900° C. to form amorphous carbon in a yield of about 35–50%.

If titanium carbide is used as carbon-containing additive, this advantageously has an average FSSS particle size of less than 5 μm, preferably less than 2 μm, and a specific surface area measured by BET of greater than 0.5 $m^2/g$, in particular greater than 1 $m^2/g$. Commercial TiC powders of sufficient fineness are particularly suitable for economic reasons.

In setting out the desired carbon content in the end product via the amount of carbon-containing additive in the starting mixture, any free carbon in the titanium carbide and boron carbide starting powders has to be taken into account. This is particularly relevant because, in carrying out the process of the invention, it has surprisingly been found that not only highly pure and therefore usually expensive carbide powders ($C_{free}$ content less than 0.1% by weight), but also technical grade carbide powders, i.e., those richer in carbon ($C_{free}$ content up to about 1% by weight), can be used as starting material.

The process of the invention is preferably carried out as follows.

The titanium diboride and the boron carbide powder are homogeneously mixed with the carbon-containing additive, which is advantageously achieved by the carbon additive being dissolved or dispersed in a solvent and the mixture of the carbide/boride powders being dispersed in the solution. When using free carbon per se, the boride/carbide powder mixtures, together with the elemental carbon, are dispersed in a solution of a temporary binder and/or lubricant. Solvents which can be used are, for example, acetone or lower aliphatic alcohols having from 1 to 6 carbon atoms. Preference is given to using water as solvent. Dispersion can be carried out by mechanical movement of a fluid suspension in plastic vessels using a stirrer or by kneading of a viscous suspension in a kneading apparatus. The solvent is then removed, for example, in the case of a fluid suspension, by spray-drying, or, in the case of a viscous suspension, by evaporation during the kneading procedure.

Since most shaping processes, particularly automatic pressing, require a free-flowing powder having a low bulk volume, the finely divided powder mixture can be subjected prior to shaping to another granulation stage to form very soft, pressing-unstable and free-flowing agglomerates. This granulation stage can be omitted if, for example, for shaping by the injection-molding process, the powder is further processed with about 40% by volume of lubricant and binder to give a plastifiable composition.

Shaping to form the pre-shaped green bodies having a density of at least 50% TD can be carried out by means of conventional known methods, for example, by uniaxial pressing, isostatic pressing, injection molding, extrusion or slip-casting. In uniaxial pressing in dies and in isostatic pressing, a pressure of 30–600 MPa, preferably between 100 and 500 MPa, is usually used.

If pressing aids and binders are present in the starting powder mixture, these can, if desired, be removed again prior to sintering by a separate heat treatment, for example, at temperatures of about 400° C.

If carbon is present in the starting powder mixture in the form of an organic carbon carrier, the green bodies are heated in a vacuum furnace to temperatures in the range between 600° C. and 1200° C. with exclusion of oxygen, the organic carbon carrier being pyrolized to leave amorphous carbon.

If carbon is introduced via titanium carbide, the green bodies are heated with exclusion of oxygen in a vacuum furnace to temperatures in the range between 1000° C. and 1500° C., preferably between 1250° C. and 1400° C., and maintained at this temperature for 10 to 600 minutes, preferably from 30 to 180 minutes, TiC reacting with a part of the boron carbide to give free carbon and metal boride. When using a mixture of the various carbon carriers, each of the corresponding process steps should preferably be carried out.

The bodies are subsequently treated in a sintering furnace with exclusion of oxygen to temperatures in the range between 2100° C. and 2250° C., preferably between 2125° C. and 2200° C., particularly preferably between 2140° C. and 2175° C. and maintained at this temperature for from 10 to 600 minutes, preferably from 30 to 300 minutes, particularly preferably from 90 to 150 minutes, and finally slowly cooled to room temperature.

After the state of closed porosity (density greater than 92% TD) has been achieved by sintering, the sintered bodies can, to achieve higher densities, be further densified by hot isostatic pressing. This is carried out, preferably prior to cooling to room temperature, by application of pressure by means of a gaseous pressure transfer medium such as argon at temperatures between 1900° C. and 2150° C. at a pressure of from 5 to 200 MPa for a time of from 5 to 60 minutes, for example, in a high-pressure autoclave. This further densification by unencapsulated hot isostatic pressing eliminates the largest part of the pores still present so that the material then has a density greater than 98% of its theoretical density.

If the material has been subjected to further densification by hot isostatic pressing, it possesses a hardness HK0.1 of greater than 2500, a flexural fracture strength of at least 500 MPa (measured on a flexural test specimen of dimensions 4×3×45 $mm^3$ by the four-point method at room temperature, distance between inner support points 20 mm, distance between outer support points 40 mm) and a fracture toughness (measured by the bridge method using flexural test specimens of the above-mentioned geometry) of at least 3.5 MPa√m.

The composite materials of the invention are suitable, inter alia, for the manufacture of tools for the cutting machining of non-ferrous metals, wood, plastic and ceramic green bodies, in particular cutting tools for non-ferrous metals, in particular for aluminum alloys, cutting tools for ceramic green bodies, cutting tools for wood, or cutting tools for fiber-reinforced plastics. The composite materials are also used, in particular, in the manufacture of wear-resistant components such as, for example, sand-blasting nozzles, water-jet nozzles, impeller blades, or mill rotors.

Other objects and features of the present invention will become apparent from the following detailed description considered in connection with the accompanying Examples, which disclose the embodiments of the present invention. It should be understood, however, that the Examples are designed for the purpose of illustration only and not as a definition of the limits of the invention.

DETAILED DESCRIPTION OF THE PREFERRED EMBODIMENTS

Table 1 gives the particle size and composition of the boron carbide, titanium diboride, titanium carbide and boron powders used in the Examples (FSSS=Fisher sub-sieve sizer).

TABLE 1

| Powder | FSSS μm | BET m$^2$/g | Ti wt. % | B wt. % | C wt. % | O wt. % | N wt. % | Fe wt. % |
|---|---|---|---|---|---|---|---|---|
| B$_4$C | — | 15.5 | — | 77.1 | 21.0 | 0.9 | 0.4 | — |
| TiB$_2$ | 0.9 | 2.5 | 66.5 | 30.6 | 0.25 | 2.2 | 0.1 | <0.2 |
| TiC | 1.5 | — | 80.5 | — | 19.4 | 0.005 | 0.001 | — |
| B amorphous | 0.9 | — | — | 95.8 | — | 2.3 | — | — |

EXAMPLE 1

563.2 g of boron carbide powder having a specific surface area of 15.5 mg$^2$/g (Table 1), 196 g of TiB$_2$ powder having a specific surface area of 2.5 m$^2$/g (Table 1) and 40.8 g of TiC (Table 1) were mixed with 0.5% by weight of methyl cellulose (Hoechst AG, Frankfurt, Germany), 1% by weight of polyethylene glycol 4000 (Hoechst AG, Frankfurt, Germany), and 3% by weight of mineral oil ester (Hoechst AG, Frankfurt, Germany) as lubricants and pressing aids, and milled in 1 dm$^3$ of distilled water in a planetary ball mill for 1 hour at 120 rpm. The powder mixture was dried in a rotary evaporator and subsequently deagglomerated in a rotor mill. This powder was subsequently cold isostatically pressed at a pressure of 200 MPa into plates of dimensions 60×20×20 mm$^3$ having a green density of 1.65 g/cm$^3$.

The green bodies were heated over a period of 1 h from room temperature to 1250° C., subsequently heated over a period of 2 h from 1250° C. to 1500° C. and then heated at a heating rate of 700° C./h to 2175° C. and maintained at this temperature under a pressure of 10 mbar of argon for 2 hours.

The specimens were subsequently cooled and their density was determined as 97.9% of the theoretical density.

Test specimens were produced from the sintered plates. Various property values of these test specimens were determined as follows.

The density was measured by the buoyancy method. The strength was determined on flexural bars of dimensions 4×3×45 mm$^3$ by the four-point bend method (distance between outer support points 40 mm, distance between inner support points 20 mm). The fracture strength K$_{IC}$ was determined by introduction of a sharp initial crack using the bridge method and a subsequent flexural test. The hardness was determined by the Knoop method using an indentation load of 0.981 N. The density and the mechanical properties measured on the test specimens are summarized in Table 2.

The sintered specimens were subjected to chemical analysis and the contents of B, Ti, O, C and N determined on the assumption that O is present as TiO$_2$, N is present as TiN and boron carbide is present as B$_{4.33}$C. From this the phase composition in the sintered body and, in particular, the elemental carbon content were calculated. The ratio C$_{free}$/B$_{4.33}$C is identified. These data are summarized in Table 3.

Some of the plates were hot isostatically pressed at 2100° C. under a pressure of 200 MPa of argon. This increased the density to 99.8% of the theoretical density.

From the further densified plates, test specimens were produced and their properties were determined as described above. The results are summarized in Tables 2 and 3.

EXAMPLE 2

393.3 g of boron carbide powder having a specific surface area of 15.5 m$^2$/g (Table 1), 316 g of TiB$_2$ powder having a specific surface area of 2.5 m$^2$/g (Table 1) and 90.4 g of TiC (Table 1) were milled, dried, pressed and subsequently sintered and hot isostatically pressed as described in Example 1.

The properties of the material were determined as described in Example 1. The results are shown in Tables 2 and 3.

EXAMPLE 3

262.4 g of boron carbide powder having a specific surface area of 15.5 m$^2$/g (Table 1), 414.4 g of TiB$_2$ powder having a specific surface area of 2.5 m$^2$/g (Table 1), and 123.2 g of TiC (Table 1) were milled, dried, pressed and subsequently sintered and hot isostatically pressed as described in Example 1.

The properties of the material were determined as described in Example 1. The results are shown in Tables 2 and 3.

EXAMPLE 4

160.8 g of boron carbide powder having a specific surface area of 15.5 m$^2$/g (Table 1), 488.8 g of TiB$_2$ powder having a specific surface area of 2.5 m$^2$/g (Table 1) and 150.4 g of TiC (Table 1) were milled, dried, pressed and subsequently sintered and hot isostatically pressed as described in Example 1.

The properties of the material were determined as described in Example 1. The results are shown in Tables 2 and 3.

EXAMPLE 5

376 g of boron carbide powder having a specific surface area of 15.5 m$^2$/g (Table 1), 377.6 g of TiB$_2$ powder having a specific surface area of 2.5 m$^2$/g (Table 1) and 46.4 g of TiC (Table 1) were milled, dried, pressed and subsequently sintered and hot isostatically pressed as described in Example 1.

The properties of the material were determined as described in Example 1. The results are shown in Tables 2 and 3.

EXAMPLE 6

369.7 g of boron carbide powder having a specific surface area of 15.5 m$^2$/g (Table 1), 392.8 g of TiB$_2$ powder having a specific surface area of 2.5 m$^2$/g (Table 1) and 33.6 g of TiC (Table 1) were milled, dried, pressed and subsequently sintered and hot isostatically pressed as described in Example 1.

The properties of the material were determined as described in Example 1. The results are shown in Tables 2 and 3.

EXAMPLE 7

12 g of phenol/formaldehyde resin (ALNOVOL PN822®, Hoechst AG, Frankfurt, Germany) were dissolved in 500 ml of acetone and homogenized together with 278.8 g of boron carbide powder having a specific surface area of 15.5 m$^2$/g (Table 1) and 121.2 g of TiB$_2$ powder having a specific surface area of 2.5 m$^2$/g (Table 1) in a planetary ball mill for 1 h at 120 rpm. The powder mixture was dried in a rotary evaporator and subsequently deagglomerated in a rotor mill. This powder was then cold isostatically pressed at a pressure of 200 MPa into cuboids of dimensions 60×20×20 mm$^3$. The green bodies were heated over a period of 8 h from room temperature to 800° C., maintained at this temperature for 30 minutes under flowing argon and then cooled to room temperature (pyrolysis). The green bodies were then heated in a sintering furnace from room temperature to 1100° C. over a period of 1 h, and heated from 1100° C. at a heating rate of 700° C./h to 2175° C. and maintained at this temperature under a pressure of 10 mbar of argon for 2 h. The specimens were subsequently cooled and their density was determined as 98.2% of the theoretical density. Some of these specimens were subsequently hot isostatically pressed at 2100° C. under a pressure of 200 MPa of argon and this increased the density to 99.9% of the theoretical density.

The properties of the material were determined as described in Example 1. The results are shown in Tables 2 and 3.

EXAMPLE 8

24 g of phenol/formaldehyde resin were dissolved in acetone and together with 278.8 g of boron carbide powder having a specific surface area of 15.5 m$^2$/g (Table 1), 121.2 g of TiB$_2$ powder having a specific surface area of 2.5 m$^2$/g (Table 1) and 0.5 dm$^3$ of acetone were milled, dried, pressed and subsequently sintered and hot isostatically pressed as described in Example 7.

The properties of the material were determined as described in Example 1. The results are shown in Tables 2 and 3.

EXAMPLE 9

36 g of phenol/formaldehyde resin were dissolved in acetone and together with 278.8 g of boron carbide powder having a specific surface area of 15.5 m$^2$/g (Table 1), 121.2 g of TiB$_2$ powder having a specific surface area of 2.5 m$^2$/g (Table 1) and 0.5 dm$^3$ of acetone were milled, dried, pressed and subsequently sintered and hot isostatically pressed as described in Example 7.

The properties of the material were determined as described in Example 1. The results are shown in Tables 2 and 3.

EXAMPLE 10

150.6 g of boron carbide powder having a specific surface area of 15.5 m$^2$/g (Table 1), 180.4 g of TiB$_2$ powder having a specific surface area of 2.5 m$^2$/g (Table 1) and 5.0 g of carbon black having a specific surface area of 100 m$^2$/g were mixed with 3% by weight of paraffin as pressing aid and were milled in 0.4 dm$^3$ of n-heptane in a planetary ball mill for 1 hour at 120 rpm. The powder mixture was dried in a rotary evaporator and subsequently deagglomerated in a rotor mill. This powder was subsequently cold isostatically pressed at a pressure of 200 MPa into cuboids of dimensions 60×20×20 mm$^3$. The green bodies were heated in a sintering furnace from room temperature to 1100° C. over a period of 1 h and heated from 1100° C. at a heating rate of 700° C./h to 2175° C. and maintained at this temperature under a pressure of 10 mbar of argon for 2 h. The specimens were subsequently cooled and their density was determined as 97.3% of the theoretical density. Some of these specimens were subsequently hot isostatically pressed at 2100° C. under a pressure of 200 MPa of argon and this increased the density to 99.7% of the theoretical density.

The properties of the material were determined as described in Example 1. The results are shown in Tables 2 and 3.

Comparative Example 1

622.8 g of boron carbide powder having a specific surface area of 15.5 m$^2$/g (Table 1), 270 g of TiB$_2$ powder having a specific surface area of 2.5 m$^2$/g (Table 1) and 7.2 g of amorphous boron (Table 1) were milled in 1 dm$^3$ of acetone in a planetary ball mill for 1 hour at 120 rpm. The powder mixture was dried in a rotary evaporator and subsequently charged into a graphite die having an internal diameter of 72 mm. 200 g of this powder mixture were subsequently hot-pressed under a pressing force of 100 kN (corresponding to a specific pressing pressure of 24.5 MPa) at a temperature of 2125° C. for 2 hours and then slowly cooled to room temperature.

The properties of the material were determined as described in Example 1. The results are shown in Tables 2 and 3.

Comparative Example 2

414 g of boron carbide powder having a specific surface area of 15.5 m$^2$/g (Table 1), 481 g of TiB$_2$ powder having a specific surface area of 2.5 m$^2$/g (Table 1) and 5.4 g of amorphous boron (Table 1) were milled, dried and hot-pressed as in Comparative Example 1.

The properties of the material were determined as described in Example 1. The results are shown in Tables 2 and 3.

TABLE 2

| Example | ρ sintered [g/cm³] | ρ HIP (HP) [g/cm³] | ρ$_{theoret.}$ [g/cm³] | $C_{free}/B_{4.33}C$ [%] | $K_{IC}$ [MPa√m] | $σ_B$ sintered [MPa] | $σ_B$ HIP [MPa] | HK 0.1 [daN/mm²] |
|---|---|---|---|---|---|---|---|---|
| Comp. 1 | — | 2.89 | 2.90 | 0.04 | 3.0 | 309 | 372 | 3140 |
| Comp. 2 | — | 3.27 | 3.27 | 0.87 | 3.5 | 320 | 390 | 3080 |
| 1 | 2.84 | 2.90 | 2.90 | 2.28 | 4.7 | 481 | 554 | 3110 |
| 2 | 3.22 | 3.26 | 3.27 | 7.34 | 6.2 | 593 | 726 | 2850 |
| 3 | 3.50 | 3.62 | 3.63 | 16.15 | 6.5 | 589 | 781 | 2750 |
| 4 | 3.79 | 3.92 | 3.93 | 36.60 | 6.8 | 557 | 740 | 2580 |
| 5 | 3.19 | 3.29 | 3.29 | 3.55 | 6.0 | 522 | 680 | 2910 |
| 6 | 3.21 | 3.29 | 3.30 | 2.78 | 5.4 | 488 | 638 | 2930 |
| 7 | 2.85 | 2.89 | 2.90 | 4.54 | 5.3 | 547 | 642 | 3090 |
| 8 | 2.82 | 2.89 | 2.90 | 6.17 | 5.7 | 536 | 650 | 3050 |
| 9 | 2.83 | 2.88 | 2.89 | 7.66 | 6.3 | 579 | 720 | 3010 |
| 10 | 3.20 | 3.28 | 3.29 | 3.53 | 5.8 | 554 | 694 | 2920 |

TABLE 3

| Example | Ti [wt %] | B [wt %] | C [wt %] | O [wt %] | N [wt %] | Total [wt %] | $TiB_2$ [wt %] | $B_{4.33}C$ [wt %] | $C_{free}$ [wt %] | Total [wt %] | $C_{free}/B_{4.33}C$ [%] |
|---|---|---|---|---|---|---|---|---|---|---|---|
| Comp. 1 | 21.8 | 63.1 | 13.68 | 0.18 | 0.22 | 98.98 | 30.16 | 66.91 | 0.03 | 97.10 | 0.04 |
| Comp. 2 | 36.9 | 52.2 | 9.50 | 0.25 | 0.19 | 99.04 | 52.07 | 44.65 | 0.39 | 97.11 | 0.87 |
| 1 | 21.4 | 62.3 | 15.00 | 0.18 | 0.22 | 99.10 | 29.58 | 66.13 | 1.51 | 97.22 | 2.28 |
| 2 | 36.2 | 60.8 | 12.01 | 0.16 | 0.09 | 99.26 | 51.75 | 43.29 | 3.18 | 98.22 | 7.34 |
| 3 | 47.9 | 41.7 | 9.22 | 0.22 | 0.11 | 99.15 | 68.50 | 25.22 | 4.07 | 97.80 | 16.15 |
| 4 | 57.4 | 35.0 | 6.51 | 0.31 | 0.12 | 99.34 | 82.04 | 11.42 | 4.18 | 97.64 | 36.60 |
| 5 | 36.3 | 52.3 | 10.81 | 0.16 | 0.02 | 99.59 | 52.24 | 45.12 | 1.60 | 98.96 | 3.55 |
| 6 | 36.3 | 52.3 | 10.46 | 0.18 | 0.01 | 99.25 | 52.25 | 45.12 | 1.25 | 98.62 | 2.78 |
| 7 | 20.9 | 60.8 | 16.10 | 0.18 | 0.22 | 98.20 | 28.85 | 64.53 | 2.93 | 96.32 | 4.54 |
| 8 | 20.4 | 60.9 | 17.26 | 0.15 | 0.11 | 98.82 | 28.74 | 64.94 | 4.01 | 97.69 | 6.17 |
| 9 | 20.9 | 60.6 | 17.97 | 0.15 | 0.09 | 99.71 | 29.56 | 64.28 | 4.85 | 98.70 | 7.55 |
| 10 | 36.3 | 62.3 | 10.80 | 0.15 | 0.01 | 99.56 | 52.31 | 45.12 | 1.59 | 99.02 | 3.53 |

While several embodiments of the present invention have been shown and described, it is to be understood that many changes and modifications may be made thereunto without departing from the spirit and scope of the invention as defined in the appended claims.

What is claimed is:

1. A composite material comprising boron carbide and titanium diboride in a volume ratio $B_4C/TiB_2$ of from 90:10 to 10:90 parts by volume; and a proportion of elemental carbon of greater than 5.0% by weight up to a maximum of 50% by weight based on the boron carbide content.

2. A composite material as claimed in claim 1 having the following properties:

density greater than 92% TD;

hardness HK 0.1 greater than 2300;

4-point flexural strength greater than 400 MPa; and fracture toughness greater than 3.5 MPa√m (measured by the bridge method).

3. A composite material as claimed in claim 1 having the following properties:

density greater than 98% TD;

hardness HK 0.1 greater than 2500;

4-point flexural strength greater than 500 MPa; and fracture toughness greater than 3.5 MPa√m (measured by the bridge method).

4. A composite material as claimed in claim 1, wherein said boron carbide and said titanium diboride are in a volume ratio $B_4C/TiB_2$ of from 90:10 to 60:40 parts by volume.

5. A composite material as claimed in claim 1, wherein there is a proportion of elemental carbon of greater than 5.0% by weight up to a maximum of 10% by weight based on the boron carbide content.

6. A composite material as claimed in claim 1, wherein said boron carbide and said titanium diboride are in a volume ratio $B_4C/TiB_2$ of from 90:10 to 60:40 parts by volume; and there is a proportion of elemental carbon of greater than 5.0% by weight up to a maximum of 10% by weight based on the boron carbide content.

7. A composite material as claimed in claim 1, wherein said boron carbide and said titanium diboride are in a volume ratio $B_4C/TiB_2$ of from 90:10 to 40:60 parts by volume.

8. A composite material as claimed in claim 1, wherein there is a proportion of elemental carbon of greater than 5.0% by weight up to a maximum of 20% by weight based on the boron carbide content.

9. A composite material as claimed in claim 1, wherein said boron carbide and said titanium diboride are in a volume ratio $B_4C/TiB_2$ of from 90:10 to 40:60 parts by volume; and there is a proportion of elemental carbon of greater than 5.0% by weight up to a maximum of 20% by weight based on the boron carbide content.

10. A composite material comprising boron carbide and titanium diboride in a volume ratio $B_4C/TiB_2$ of from 90:10 to 10:90 parts by volume; and a proportion of elemental carbon of greater than 6.17% by weight up to a maximum of 50% by weight based on the boron carbide content.

11. A composite material as claimed in claim 10, wherein there is a proportion of elemental carbon of greater than 16.15% by weight up to a maximum of 50% by weight based on the boron carbide content.

12. A composite material as claimed in claim 10, wherein there is a proportion of elemental carbon of greater than 36.60% by weight up to a maximum of 50% by weight based on the boron carbide content.

* * * * *